United States Patent [19]

Reilly et al.

[11] Patent Number: 4,604,278
[45] Date of Patent: Aug. 5, 1986

[54] PRODUCTION OF AMMONIUM TETRATHIOMOLYBDATE

[75] Inventors: Kenneth T. Reilly, Towanda; Robin W. Munn, Sayre; Henry E. Hoffman; Alan D. Douglas, both of Towanda, all of Pa.

[73] Assignee: GTE Products Corporation, Stamford, Conn.

[21] Appl. No.: 734,985

[22] Filed: May 17, 1985

[51] Int. Cl.$^4$ .............................................. C01G 39/00
[52] U.S. Cl. .................................................. 423/517
[58] Field of Search ........................... 423/517, 58, 55

[56] References Cited

U.S. PATENT DOCUMENTS

| | | | |
|---|---|---|---|
| 2,556,255 | 6/1951 | Carosella | 423/58 |
| 2,892,741 | 6/1959 | Spengler et al. | 423/565 |
| 3,764,649 | 10/1973 | Kurtak et al. | 423/517 |
| 3,876,755 | 4/1975 | Kurtak et al. | 423/517 |
| 4,242,328 | 12/1980 | Hem et al. | 423/419 P |

OTHER PUBLICATIONS

Kirk-Othmer, *Encyclopedia of Chemical Technology*, Third Edition, vol. 9 (1980), pp. 367-369, John Wiley & Sons.

*Primary Examiner*—John Doll
*Assistant Examiner*—Wayne A. Langel
*Attorney, Agent, or Firm*—Donald R. Castle; L. Rita Quatrini

[57] ABSTRACT

A process is disclosed for producing ammonium tetrathiomolybdate. The process involves reacting an ammoniacal molybdate solution with hydrogen sulfide gas, the solution and the gas being in a closed system and the flow of the gas being regulated at an elevated pressure to form a slurry consisting essentially of a solid essentially all of which is ammonium tetrathiomolybdate containing a portion of the starting molybdenum and a mother liquor containing the balance of the molybdenum. The slurry is then cooled to ambient temperature and the solid is removed from the major portion of the mother liquor. The solid is then washed with water and with alcohol followed by removal of the resulting respective water and alcohol washes to remove the remaining portion of the mother liquor and soluble impurities from the solid. The resulting washed solid is then dried at ambient temperature to form the final ammonium tetrathiomolybdate.

7 Claims, No Drawings

PRODUCTION OF AMMONIUM TETRATHIOMOLYBDATE

BACKGROUND OF THE INVENTION

This invention relates to a process for producing ammonium tetrathiomolybdate. More particularly, it relates to a process for producing ammonium tetrathiomolybdate which can be carried out economically on a commercial scale.

Ammonium tetrathiomolybdate has found use as a precurser in the preparation of molybdenum disulfide catalysts and lubricants.

Heretofore, it has been produced on a laboratory scale. Laboratory techniques involve bubbling hydrogen sulfide gas through an ammoniacal molybdate solution in an open system. The hydrogen sulfide which is not absorbed by the solution escapes to the atmosphere. This technique would be costly on a commercial scale as it would result in a substantial loss of hydrogen sulfide.

Therefore, a process for producing ammonium tetrathiomolybdate economically on a commercial scale would be highly desirable and an advancement in the art.

SUMMARY OF THE INVENTION

In accordance with one aspect of this invention, there is provided a process for producing ammonium tetrathiomolybdate. The process involves reacting an ammoniacal molybdate solution with hydrogen sulfide gas, the solution and the gas being in a closed system and the flow of the gas being regulated at an elevated pressure to form a slurry consisting essentially of a solid essentially all of which is ammonium tetrathiomolybdate containing a portion of the starting molybdenum and a mother liquor containing the balance of the molybdenum. The slurry is then cooled to ambient temperature and the solid is removed from the major portion of the mother liquor. The solid is then washed with water and with alcohol followed by removal of the resulting respective water and alcohol washes to remove the remaining portion of the mother liquor and soluble impurities from the solid. The resulting washed solid is then dried at ambient temperature to form the final ammonium tetrathiomolybdate.

DETAILED DESCRIPTION OF THE INVENTION

For a better understanding of the present invention, together with other and further objects, advantages, and capabilities thereof, reference is made to the following disclosure and appended claims in connection with the above description of some of the aspects of the invention.

The starting source of molybdate in the process of this invention is an ammoniacal ammonium molybdate solution which is preferably prepared by dissolving ammonium paramolybdate in an aqueous solution of from about 0.1 normal to about 15 normal, and preferably about 15 normal ammonium hydroxide to give a concentration of from about 5 to about 300 grams of Mo per liter. At concentrations less than about 5 grams of Mo per liter no ammonium tetrathiomolybdate subsequently precipitates and at concentrations greater than about 300 grams of Mo per liter not all of the ammonium paramolybdate remains solubilized.

The ammoniacal molybdate solution is reacted with hydrogen sulfide gas, the flow of the gas being regulated at an elevated pressure of at least about 0.5 PSIG, and preferably at from about 5 to about 250 PSIG with about 5 PSIG being especially preferred, to form a slurry consisting essentially of a solid essentially all of which is ammonium tetrathiomolybdate containing a portion of the starting molybdenum and a mother liquor containing the balance of the molybdenum. The length of time of the gassing procedure depends on the size of the reaction vessel, the amount of molybdenum charged, and the actual pressure of the hydrogen sulfide gas.

The reaction is done in a closed system. Therefore only the hydrogen sulfide which is absorbed and reacted will be drawn off the source of the gas, therefore no gas is wasted. A gas regulator on the hydrogen sulfide gas line maintains the pressure inside the sealed reaction tank at the desired pressure. As the hydrogen sulfide is used up by the reaction to form the ammonium tetrathiomolybdate, the pressure inside the tank is effectively decreased. This causes the hydrogen sulfide gas regulator to allow more gas into the tank until the pressure stabilizes at the desired pressure. As the hydrogen sulfide is reacted more is admitted to the reaction tank. Since the reaction to form the ammonium tetrathiomolybdate is exothermic, the temperature will be elevated by about 20° C. to about 30° C. during the reaction. When the temperature begins to drop, it indicates that the reaction has reached completion. The contents of the reaction tank have therefore reached equilibrium and the flow of the hydrogen sulfide gas stops. The tank is then vented. The gassing can be continued at an elevated pressure for a period of time to aid in cooling and crystallizing the ammonium tetrathiomolybdate.

The resulting slurry is then allowed to cool to ambient temperature.

The solid is then separated from the major portion of the mother liquor by any standard method with the preferred method being filtration.

The balance of the mother liquor which is entrained in the solid must be removed from the solid because the mother liquor decomposes, and if any mother liquor remains on the solid a film of sulfur will be left on the solid. The solid is washed with water, preferably cold deionized water and then with alcohol, preferably ethyl alcohol to remove the balance of the mother liquor which is entrained in the solid and soluble impurities from the solid. The washing steps are preferably done by pouring the washes, that is, the water and then the alcohol, on the solid which is preferably on a filter funnel and applying a vacuum to remove the resulting respective wash solutions.

The resulting water wash can be added to the mother liquor to conserve molybdenum and reaction materials such as ammonium hydroxide, and sulfide.

The alcohol wash can be reused until it is saturated with mother liquor after which the resulting saturated alcohol wash is processed to reclaim the alcohol for resue in the washing step, and to form a molybdenum containing residue which is processed to remove the molybdenum.

The alcohol can be reclaimed by any method such as by standard commercial distillation. The molybdenum can be recovered from the molybdenum containing residue by any method known in the art.

The mother liquor which includes any reclaimed mother liquor and which consists essentially of ammonium hydroxide, ammonium paramolybdate, dissolved ammonium tetrathiomolybdate, and ammonium sulfide can be recycled with additional ammonium hydroxide and ammonium paramolybdate, and reacted with hydrogen sulfide to form ammonium tetrathiomolybdate.

The washed solid is dried at ambient temperature to form the final ammonium tetrathiomolybdate. The drying is done preferably by either air or vacuum drying. Heat causes decomposition of the ammonium tetrathiomolybdate.

Because of the gassing technique which is done in a closed system thus conserving hydrogen sulfide, recycling of the mother liquor, and reuse of the alcohol wash solution, and recycling of the water wash solution, the above process can be operated economically on a commercial scale. To more fully illustrate this invention, the following non-limiting example is presented.

EXAMPLE

About 13 gallons of ammonium hydroxide at a concentration of about 15 normal is charged to a tank with about 5.0 kilograms of ammonium paramolybdate. The tank is sealed and hydrogen sulfide gas is then introduced into the tank at from about 5 to about 8 PSIG. This pressure is maintained for about 3 hours. At the end of the 3 hours, the tank is vented and gassing is continued for about an additional 30 minutes at from about 5 to about 10 PSIG. The tank is then cooled to about 20° C. The resulting slurry is then removed from the tank and filtered. The resulting solid is then washed on the filter funnel with about 2½ liters of cold deionized water which is removed from the solid by vacuum. The water washed solid is then washed with about 2 liters of denatured alcohol which is then removed from the solid by vacuum. The resulting washed solid is then air dried with some agitation for about 2 hours. The yield of ammonium tetrathiomolybdate is from about 10 to about 15 pounds.

About 6½ gallons of ammonium hydroxide at a concentration of about 15 normal and about 6½ gallons of the mother liquor from the above reaction are charged to a tank with about 5 kilograms of ammonium paramolybdate. The procedure described above is repeated to obtain a second batch of ammonium tetrathiomolybdate. The alcohol used to wash the solid from the first reaction is used to wash the solid from this second reaction. The yield from this second reaction is from about 15 to about 20 pounds of ammonium tetrathiomolybdate.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for producing ammonium tetrathiomolybdate comprising:
   (a) reacting an ammoniacal molybdate solution with hydrogen sulfide gas, said solution and said gas being in a closed system and the flow of said gas being regulated at an elevated pressure to form a slurry consisting essentially of a solid essentially all of which is ammonium tetrathiomolybdate containing a portion of the starting molybdenum and a mother liquor containing the balance of the molybdenum;
   (b) cooling said slurry to ambient temperature;
   (c) separating said solid from the major portion of said mother liquor;
   (d) washing said solid with water and with alcohol followed by removing the resulting respective water and alcohol washes to remove the remaining portion of said mother liquor and soluble impurities from said solid; and
   (e) drying the resulting washed solid at ambient temperature to form the final ammonium tetrathiomolybdate.

2. A process according to claim 1 wherein said ammoniacal molybdate solution is contacted with said hydrogen sulfide gas at a pressure of from about 0.5 PSIG to about 250 PSIG.

3. A process according to claim 2 wherein the pressure is about 5 PSIG.

4. A process according to claim 1 comprising the additional step of adding the mother liquor to said ammoniacal molybdate solution prior to contacting said solution with said gas.

5. A process according to claim 4 wherein the resulting water wash is added to the mother liquor.

6. A process according to claim 4 wherein the alcohol is ethyl alcohol.

7. A process according to claim 4 wherein the resulting alcohol wash is reused in the washing step until the alcohol is saturated with mother liquor after which the resulting saturated alcohol wash is processed to reclaim the alcohol for reuse in the washing step, and to form a molybdenum containing residue which is processed to remove the molybdenum.

* * * * *